US009637227B2

(12) United States Patent
Von Novak et al.

(10) Patent No.: US 9,637,227 B2
(45) Date of Patent: May 2, 2017

(54) UNMANNED AERIAL VEHICLE HYBRID ROTOR DRIVE

(71) Applicant: QUALCOMM Incorporated, San Diego, CA (US)

(72) Inventors: William Henry Von Novak, San Diego, CA (US); Linda Stacey Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 14/855,448

(22) Filed: Sep. 16, 2015

(65) Prior Publication Data

US 2017/0073065 A1  Mar. 16, 2017

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B64C 27/08* | (2006.01) | |
| *H02K 7/18* | (2006.01) | |
| *H02P 3/12* | (2006.01) | |
| *B64C 19/00* | (2006.01) | |
| *B64C 39/02* | (2006.01) | |

(52) U.S. Cl.
CPC ............. *B64C 27/08* (2013.01); *B64C 19/00* (2013.01); *B64C 39/024* (2013.01); *H02K 7/1823* (2013.01); *H02P 3/12* (2013.01); *B64C 2201/024* (2013.01); *B64C 2201/042* (2013.01); *B64C 2201/108* (2013.01)

(58) Field of Classification Search
CPC ....... B64C 27/08; B64C 39/024; B64C 19/00; B64C 2201/042; B64C 2201/024; B64C 2201/108; H02K 7/1823; H02P 3/12
USPC ........................................................ 701/1, 3
See application file for complete search history.

(56) References Cited

U.S. PATENT DOCUMENTS

| | | | |
|---|---|---|---|
| 8,296,036 B2 | 10/2012 | Matuszeski et al. | |
| 9,550,400 B2* | 1/2017 | Hutson | ..................... B60F 5/02 |
| 2010/0198514 A1 | 8/2010 | Miralles | |
| 2012/0209456 A1 | 8/2012 | Harmon et al. | |
| 2013/0099065 A1 | 4/2013 | Stuhlberger | |
| 2013/0214089 A1 | 8/2013 | Cox et al. | |
| 2016/0244176 A1* | 8/2016 | Xiao | ......................... B60L 7/10 |
| 2016/0280369 A1* | 9/2016 | Pounds | ................... A63H 27/00 |

* cited by examiner

*Primary Examiner* — Jaime Figueroa
(74) *Attorney, Agent, or Firm* — The Marbury Law Group, PLLC

(57) ABSTRACT

Devices, methods, and systems of various embodiments are disclosed including an unmanned aerial vehicle (UAV) having a hybrid rotor drive system. The UAV may include a frame, a primary rotor, a plurality of auxiliary rotors, a battery, and a processor coupled to the battery and the auxiliary rotors. The primary rotor may be configured to generate thrust with a downwash of air. The plurality of auxiliary rotors may each be at least partially disposed in the downwash of air generated by the primary rotor. The plurality of auxiliary rotors may be configured to be able to harvest energy from the downwash of air. The battery may be configured to store at least some of the energy harvested from the downwash of air by the plurality of auxiliary rotors. The processor may be configured with processor-executable instructions to utilize the plurality of auxiliary rotors to provide flight control for the UAV.

29 Claims, 6 Drawing Sheets

UNMANNED AERIAL VEHICLE HYBRID ROTOR DRIVE

BACKGROUND

Unmanned aerial vehicles (UAVs) commonly include multiple, such as four or more, fixed-pitch rotors, driven by controllable electric motors, providing take-off, hover, and landing capabilities with a high degree of freedom. The UAVs often use differential drives, which direct one or more of the rotors to generate different levels of thrust in order to control pitch, yaw, and/or roll, and thus generate a net thrust vector of the UAV. The rotors of some UAVs are driven by electric motors powered by an onboard battery, but such UAVs do not tend to have long-range capabilities without requiring refueling along the way. In contrast, rotors driven by engines that use higher density fuel sources, such as an internal combustion engine, have an increased range but are heavy, more expensive, less reliable, and noisy.

SUMMARY

Devices, methods, and systems of various embodiments are disclosed including a UAV having a hybrid rotor drive system. In various embodiments, the UAV may include a frame, a primary rotor, a plurality of auxiliary rotors, a battery, and a processor coupled to the battery and the auxiliary rotors. The primary rotor may be supported by the frame and configured to generate thrust with a downwash of air. The plurality of auxiliary rotors may each be supported by the frame and at least partially disposed in the downwash of air generated by the primary rotor. The plurality of auxiliary rotors may be configured to be able to harvest energy from the downwash of air. The battery may be configured to store at least some of the energy harvested from the downwash of air by the plurality of auxiliary rotors. The processor may be configured with processor-executable instructions to utilize the plurality of auxiliary rotors to provide flight control for the UAV.

In various embodiments, an amount of energy harvested by selected ones of the plurality of auxiliary rotors may be controlled as part of implementing flight control parameters that provide flight control for the UAV. Flight control parameters for the UAV may be determined based on received flight control inputs. The control of the amount of energy harvested by selected ones of the plurality of auxiliary rotors may include harvesting different amounts of energy from at least two of the plurality of auxiliary rotors. The flight control parameters may be implemented to provide the flight control by controlling an amount of energy harvested by a first one of the plurality of auxiliary rotors and connecting the battery to a second one of the plurality of auxiliary rotors to generate auxiliary thrust for propulsion of the UAV.

In various embodiments, a plurality of auxiliary motors may each be coupled to a respective auxiliary rotor of the plurality of auxiliary rotors. Each of the plurality of auxiliary motors may include a pulse width modulation circuit that may be configured to selectively couple windings of a respective auxiliary motor of the plurality of auxiliary motors to the battery in order to adjust an amount of energy harvested by the respective auxiliary rotor or an amount power drawn from the battery to generate auxiliary thrust by the respective auxiliary rotor. Each of the plurality of auxiliary motors may include a first set of metal-oxide semiconductor field-effect transistors (MOSFETs) and a second set of MOSFETs. The first and second sets of MOSFETS may be controlled differently in order to adjust an amount of energy harvested by the respective auxiliary rotor or an amount power drawn from the battery to generate auxiliary thrust by the respective auxiliary rotor.

The battery may be connected to selected ones of the plurality of auxiliary rotors in order to generate auxiliary thrust to provide at least part of the flight control for the UAV. The battery may be connected to each of the plurality of auxiliary rotors to generate sufficient auxiliary thrust to land the UAV without propulsion from the primary rotor. The battery may be connected to each of the plurality of auxiliary rotors to generate sufficient auxiliary thrust to enable take off without propulsion from the primary rotor.

In various embodiments, a dump resistor may be electrically coupled to the plurality of auxiliary rotors via a switch coupled to the processor and configured to dissipate the energy harvested from the downwash of air. Each of the plurality auxiliary rotors may be movable along a separate radially extending track secured to the frame. Movement of each of the plurality auxiliary rotors along the separate radially extending track may vary how much of each of the plurality auxiliary rotors is disposed in the downwash of air. An adjustable throttle setting that controls the primary rotor may be adjusted. The primary rotor may be an internal combustion engine with a fixed throttle setting. The plurality of auxiliary rotors may be equally spaced away from a rotational axis of the primary rotor. The plurality of auxiliary rotors may include at least four or more auxiliary rotors.

Various embodiments include a method of operating a UAV as summarized above, which may include receiving a flight control input, determining flight control parameters that provide flight control for the UAV based on the flight control input, and adjusting an amount of energy harvested by selected ones of a plurality of auxiliary rotors.

Further embodiments include a UAV having means for performing functions of the method operations described above. Further embodiments include a non-transitory processor-readable storage medium having stored thereon processor-executable instructions configured to cause a processor to perform operations of the above-discussed method operations.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
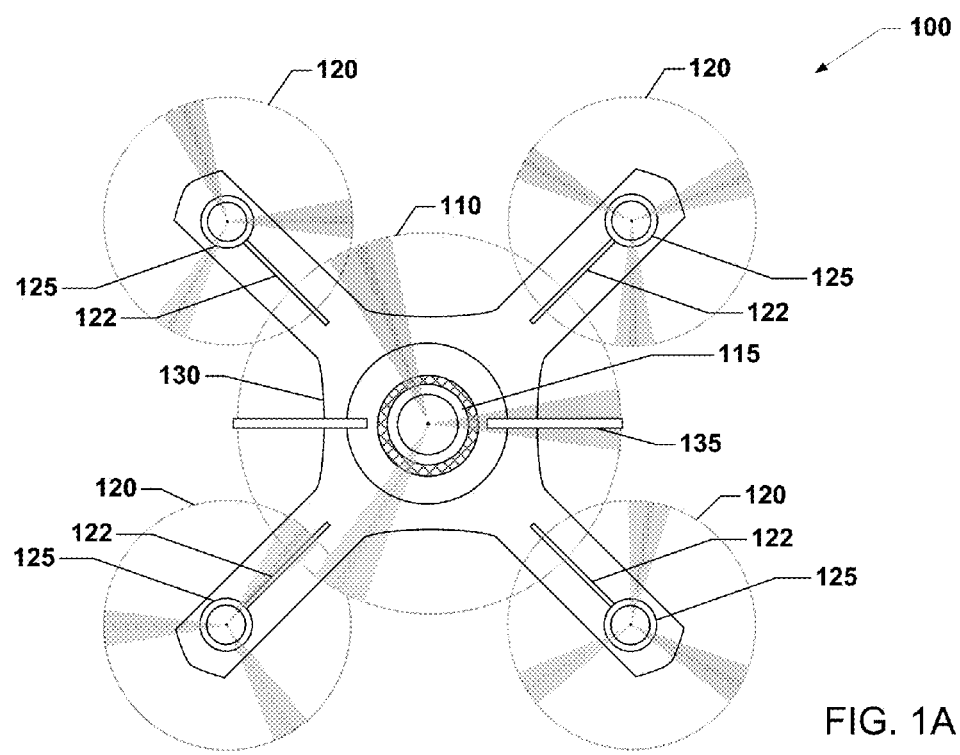
FIG. 1A is a top view of a UAV with a hybrid rotor drive according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a UAV with a hybrid rotor drive that includes a primary rotor air linked with a plurality of auxiliary rotors. In some embodiments, the plurality of auxiliary rotors may include at least four rotors. The primary rotor may be configured to generate a downwash of air for propulsion of the UAV. The plurality of auxiliary rotors may each be at least partially disposed in the downwash of air generated by the primary rotor. The plurality of auxiliary rotors are referred to as being "air linked" to or having an "air link" with the primary rotor since the downwash of air from the primary rotor can drive the auxiliary rotors without any other mechanical linkage between them. The auxiliary rotors may be configured to harvest energy from the downwash of air, storing electrical energy in a battery. By regulating an amount of electrical energy generated by each auxiliary rotor and/or powering each auxiliary rotor, an amount of auxiliary thrust either opposite or in the same direction as the downwash of air from the primary rotor may be generated. In this way, the thrust generated by the downwash of air from the primary rotor may be adjusted, which may be used to provide flight control. The auxiliary rotors may be driven independently, but with the additional ability to "brake" the auxiliary rotors by adjusting the amount of energy harvested from the downwash of air from the primary rotor. Thus, a flight control system variably adjusting an amount of energy harvested by the plurality of auxiliary rotors and/or the power applied to auxiliary rotors may implement flight control parameters that provide flight control for the UAV.

Various embodiments transfer energy from a primary rotor to a set of auxiliary rotors by vertically overlapping a region in which the primary rotor rotates relative to the individual regions in which the auxiliary rotors rotate. This overlapping configuration places the set of auxiliary rotors at least partially in the downwash of air generated by the primary rotor. In this way, when the primary rotor is running and generating thrust, the primary rotor may drive the set of auxiliary rotors as well. Generally, the primary rotor will generate more thrust than is needed for the UAV to fly. Thus, although the set of auxiliary rotors may be extracting some energy from the primary rotor thrust, there should be enough net thrust for the UAV to operate effectively. In addition, the UAV may control its flight by varying the amount of energy each individual auxiliary rotor extracts.

As used herein, the term "UAV" refers to one of various types of unmanned aerial vehicle. A UAV may include an onboard computing device configured to fly and/or operate the UAV without remote operating instructions (i.e., autonomously), such as from a human operator or remote computing device. Alternatively, the onboard computing device may be configured to fly and/or operate the UAV with some remote operating instruction or updates to instructions stored in a memory of the onboard computing device. The UAV may be propelled for flight in any of a number of known ways. For example, a plurality of propulsion units, each including one or more rotors, may provide propulsion or lifting forces for the UAV and any payload carried by the UAV. In addition, the UAV may include wheels, tank-tread, or other non-aerial movement mechanisms to enable movement on the ground. Further, the UAV may be powered by one or more types of power source, such as electrical, chemical, electro-chemical, or other power reserve, which may power the propulsion units, the onboard computing device, and/or other onboard components.

The term "downwash" (e.g., a downwash of air) is used herein generally to refer to a current of air deflected by the aerodynamic action of a spinning rotor as part of the process of generating propulsion used for lift and translational flight. A downwash may be generated in any direction and is not limited to being generated in a downward vertical direction.

The term "computing device" is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

Figure 10:
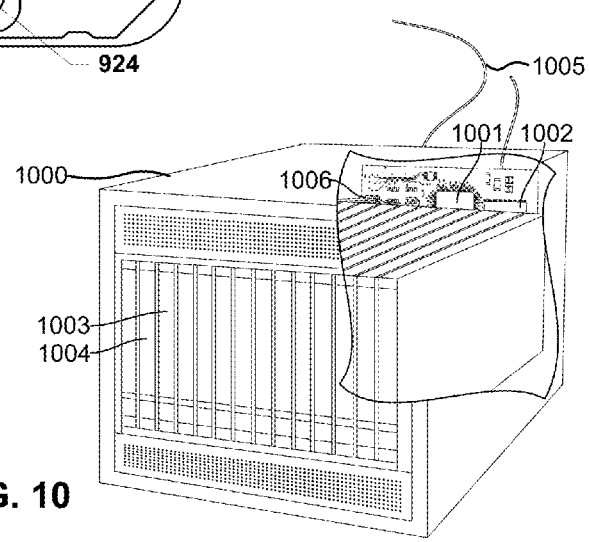
FIG. 10 is a component diagram of an example server suitable for use with the various embodiments.

The term "server" as used herein refers to any computing device capable of functioning as a server, such as a master exchange server, web server, and a personal or business computing device configured with software to execute server functions (e.g., a "light server"). Thus, various computing devices may function as a server, such as any one or all of cellular telephones, smart-phones, web-pads, tablet computers, Internet enabled cellular telephones, Wi-Fi enabled electronic devices, laptop computers, personal computers, and similar electronic devices equipped with at least a processor, memory, and configured to communicate with a UAV. A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or business computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 10.

The word "exemplary" is used herein to mean "serving as an example, instance, or illustration." Any implementation described herein as "exemplary" is not necessarily to be construed as preferred or advantageous over other implementations.

Various embodiments may be implemented using a variety of UAV configurations. A flight propulsion source for a UAV may be one or more propellers that generate a lifting force sufficient to lift the UAV (including the UAV structure, motors, electronics, and power source) and any loads that may be attached to the UAV (e.g., a payload). In various embodiments, the flight propulsion sources may be powered by a combination of internal combustion engine and electric motor powered. While the present disclosure is directed to hybrid rotor drives using a fuel-based engine in combination with battery-driven motors, the claims and embodiments may be applied equally to UAVs powered by various additional types of power source.

Flight propulsion sources may be vertical or horizontally mounted depending on the flight mode of the UAV. A common UAV configuration suitable for use in the various embodiments is a 5-rotor configuration (i.e., a pentacopter). In an example pentacopter configuration, typically five or more horizontally configured rotary propellers and motors are fixed to a frame. The frame may include a frame structure with landing skids that supports the propeller motors, fuel tank, energy source (e.g., battery), payload securing mechanism, and so on. A payload may be attached in a central area underneath the frame structure platform of the UAV, such as an area enclosed by the frame structure and skids underneath the flight power sources or propulsion units. A pentacopter-style horizontal rotor UAV may fly in any unobstructed horizontal and vertical direction or may hover in one place. A pentacopter UAV configuration is used for illustrative purposes in the examples described herein; however, other UAV designs may be used.

A UAV may be configured with processing components that enable the UAV to navigate, such as by controlling the flight motors to achieve flight directionality, and communication components that enable the UAV to receive position information and information from external systems including servers, access points, other UAVs, and so on. The position information may be associated with the current UAV position, waypoints, flight paths, avoidance paths/sites, altitudes, destination sites, relative locations of other UAVs, and potential refueling/recharging sites Various embodiments include a UAV 100 with flight control provided by a hybrid rotor drive. With reference to the top plan and side elevation views illustrated in FIGS. 1A and 1B, the UAV 100 may include a primary rotor 110 and at least four auxiliary rotors 120 supported by a frame 130. The primary rotor 110 may be driven by a primary motor, which may be an internal combustion engine (not shown), and the auxiliary rotors 120 may each be associated with an auxiliary motor 125. In addition, anti-rotation vanes 135 may be provided to offset some of the torque generated by the primary rotor 110 and optionally the auxiliary rotors 120. The anti-rotation vanes 135 may be reoriented, in a similar manner to ailerons, for providing a specific amount of counter-torque to oppose torque generated by the primary rotor 110. The anti-rotation vanes 135 may also be deflected and then fixed in place to provide a moderate amount of attitude correction, with the balance coming from differential control from the auxiliary rotors 120. The anti-rotation vanes 135 may be adjusted manually or actuated by a motor drive.

For ease of description and illustration, some detailed aspects of the UAV 100 are omitted such as wiring, frame structure interconnects or other features that would be known to one of skill in the art. For example, the UAV 100 may be constructed with an internal frame having a number of support structures or using a molded frame in which support is obtained through the molded structure. In the illustrated embodiments, the UAV 100 has a total of five rotors 110, 120. However, more (or fewer) than five rotors 110, 120 may be used. In addition, although various embodiments illustrate an even number of auxiliary rotors 120 and odd number of auxiliary rotors greater than four may be used.

During operation, when the primary rotor 110 is spinning and generating thrust, a downwash of air 5 generated by the primary rotor 110 drives the auxiliary rotors 120 to spin as well. The UAV 100 may maintain flight control by decreasing or increasing resistance to individual ones of the auxiliary rotors 120. In general, the primary rotor 110 will generate more thrust than is needed to allow the UAV 100 to fly. Thus, the auxiliary rotors 120 may extract some of the excess thrust to provide energy to operate the UAV's control systems. The UAV 100 may fly or even hover by one or more of the auxiliary rotors 120 to extract more or less energy from the downwash of air 5. When each of the auxiliary rotors 120 extracts energy from the downwash of air 5, mixed aerodynamic forces are produced that collectively impede a portion of the thrust from the primary rotor 110. The mixed aerodynamic forces produced by each of the auxiliary rotors 120 may include drag in the downwash of air 5, lift outside the downwash of air 5, and auxiliary torque to the frame 130. Additionally, while the primary rotor 110 is running, the primary rotor may also generate adverse torque. This primary rotor torque may be cancelled out or offset by varying the amount of mixed aerodynamic forces produced by the auxiliary rotors 120, the use of the anti-rotation vanes 135, or a combination thereof.

A hybrid rotor drive in accordance with various embodiments may be achieved using conventional off-the-shelf rotors and motors, which provides a mechanical simplicity and reliability. For example, no mechanical linkage is needed between the primary rotor 110 and the auxiliary rotors 120, which simplifies the assembly. The internal combustion engine of the primary motor 115 takes advantage of fuels with high energy density, such as petroleum-based fuels, which may increase the efficiency, range, and utility of the UAV 100. The auxiliary motors 125, which are electrically controlled, may be very light weight and provide very nimble and precise flight controls. In this way, the hybrid rotor drive in accordance with various embodiments may take advantage of some of the best features of two different types of motors.

The auxiliary rotors 120 may provide an emergency backup for the UAV 100 in the event the primary motor 115 driving the primary rotor 110 fails due to fuel exhaustion or mechanical failure. By driving the auxiliary rotors 120 with energy stored in an onboard battery, the auxiliary rotors 120 may provide auxiliary thrust in a more conventional manner. The energy stored in the onboard battery may have been harvested previously (i.e., before the primary rotor 110 failure) by the auxiliary rotors 120 as described. Thus, the auxiliary rotors 120 may be used to provide a safe landing with energy stored in the onboard battery. In addition, shutting down the primary motor 115 and using the auxiliary rotors 120 to generate propulsion may provide a quiet landing or take-off for the UAV 100. If the auxiliary rotors 120 are used as the only or primary source of lift propulsion during take-off, the onboard battery would need to hold or be provided with sufficient charge for the task and thus may need to be charged ahead of time. For autonomous take-off, an external source of electrical power may be provided. For example, a launch pad, starter cone, or ratcheting coupling may be provided via external components to assist in engine start for take-off.

Optionally, the auxiliary rotors 120 and auxiliary motors 125 may be mounted on a radially extending track 122, which is secured to or incorporated into the frame 130. The radially extending track 122 allows each auxiliary rotor 120 (along with its corresponding auxiliary motors 125) to be moved along the radially extending track 122. Movement of each of the auxiliary rotors 120 along the radially extending track 122 may enable a control system to vary the degree to which each auxiliary rotor 120 is disposed within the downwash of air 5 generated by the primary rotor 110. Varying the overlap between auxiliary rotors 120 and the downwash of the primary rotor 110 may vary the amount of energy generated and the amount of mixed aerodynamic forces produced by each auxiliary rotor.

Figure 1B:
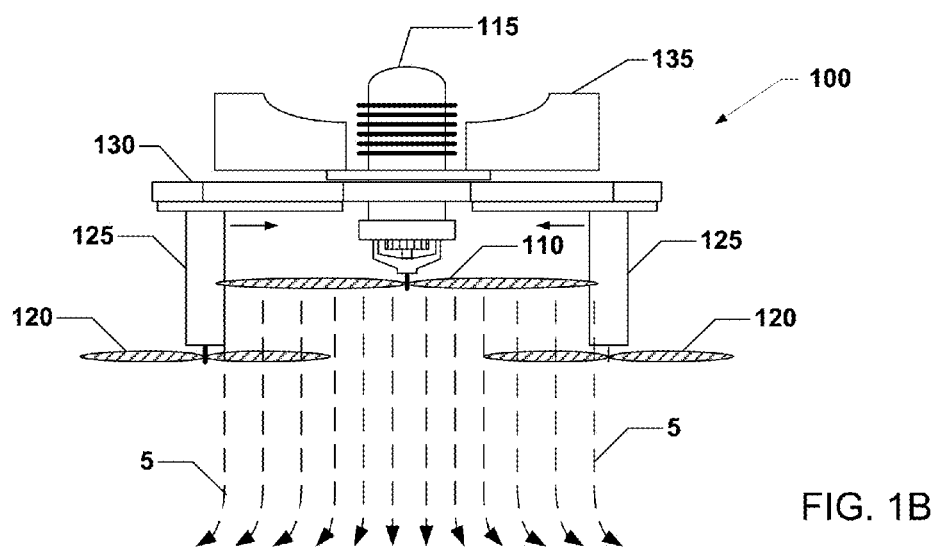
FIG. 1B is a side elevation view of the UAV in FIG. 1A according to various embodiments.
Figure 2A:
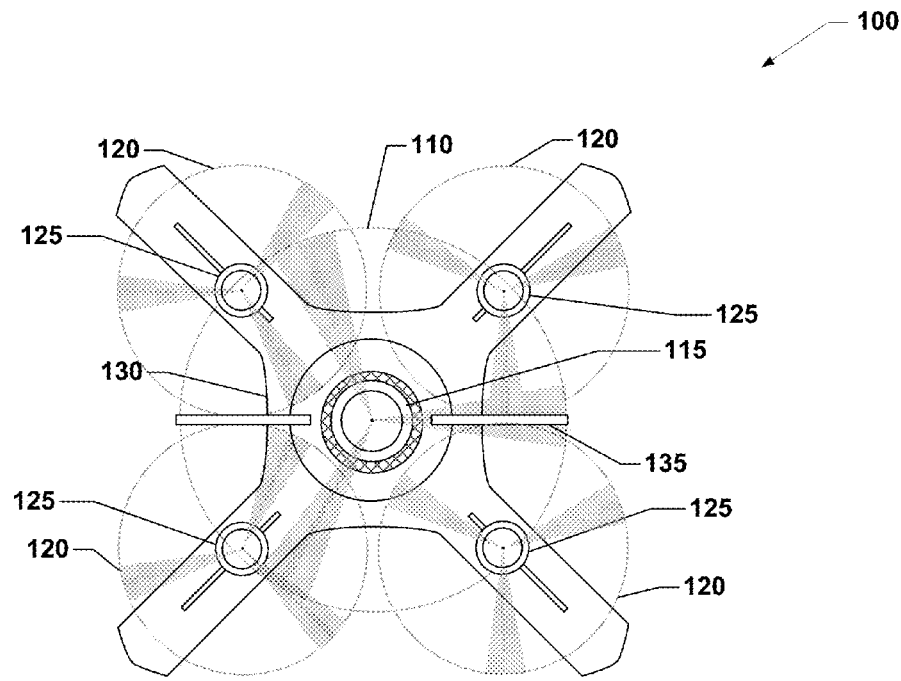
FIG. 2A is a top view of the UAV in FIG. 1A, with auxiliary rotors disposed further under the primary rotor, in according to various embodiments.
Figure 2B:
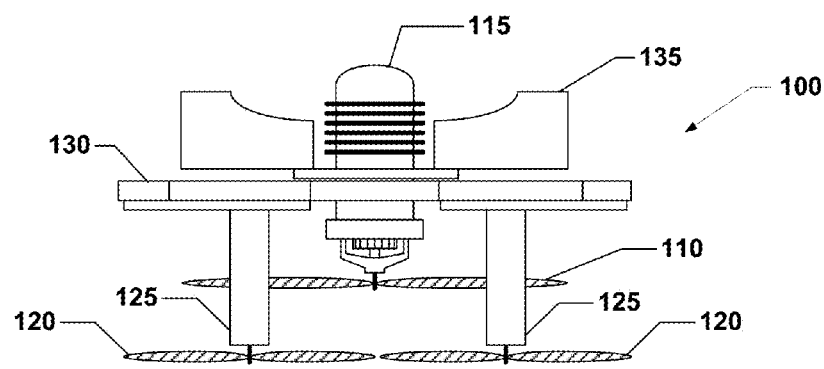
FIG. 2B is a side elevation view of the UAV in FIG. 2A according to various embodiments.

FIGS. 2A is and 2B illustrate the UAV 100 of FIGS. 1A and 1B, but with the auxiliary rotors 120 moved radially inwardly, in accordance with various embodiments. With reference to FIGS. 1A-2B, the UAV 100 may include radially extending tracks 122 used for adjusting a position of the auxiliary rotors 120. As illustrated (e.g., in FIG. 2A), the amount of overlap between the primary rotor 110 and the auxiliary rotors 120 may be changed by changing the radial position of auxiliary rotors 120 relative to the primary rotor 110. In this way, the UAV 100 may be configured with variable levels of overlap between the primary rotor 110 and the auxiliary rotors 120. Providing significant overlap of the auxiliary rotors with the primary rotor (e.g., illustrated in FIG. 2A) may allow significant amounts of power to be extracted by the auxiliary rotors 120. Minimizing the overlap of the auxiliary rotors with the primary rotor (e.g., illustrated FIG. 1A) may reduce the amount of power that may be drawn from the downwash of air, but provide higher overall efficiencies by reducing the mixed aerodynamic forces working opposite the main thrust of the UAV 100.

Figure 3:
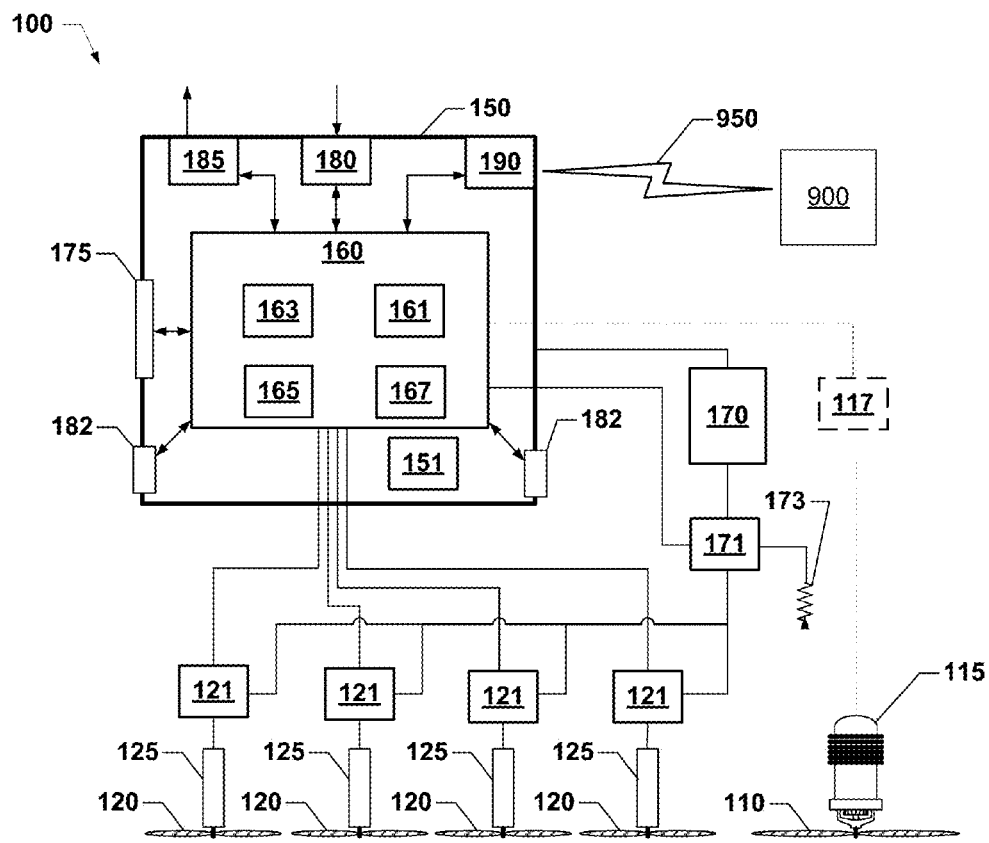
FIG. 3 is a schematic diagram illustrating components of a UAV with a hybrid rotor drive according to various embodiments.

FIG. 3 illustrates the UAV 100 that may be used with various embodiments. With reference to FIGS. 1A-3, the UAV 100 may include a control unit 150 that may include various circuits and devices used to power and control the operation of the UAV 100. For example, the control unit 150 may include a processor 160 configured with processor-executable instructions to control flight and other operations of the UAV 100, including operations of the various embodiments. The control unit 150 may optionally be coupled to the primary rotor 110 by way of the primary motor 115. The control unit 150 may be configured to monitor the status of the primary motor 115. The primary motor 115 may operate with a fixed throttle setting, using the auxiliary rotors to provide flight control for the UAV 100. Optionally, the UAV 100 may include an adjustable throttle 117 on the primary motor 115 that is controlled by the processor 160 to enable adjusting the amount of lift or thrust generated by the primary rotor.

The control unit 150 may be coupled to each of the auxiliary rotors 120 by way of their corresponding auxiliary motors 125. Optionally, each of the auxiliary motors 125 may have an auxiliary controller 121 that handles specialized functions. The UAV 100 may also include an onboard battery 170, which may be coupled to the auxiliary motors 125 (e.g., via auxiliary controllers 121) and the control unit 150. Each of the auxiliary controllers 121 may include a pulse-width modulation (PWM) circuit, which may be used to control the individual speeds of the auxiliary motors 125.

The control unit 150 may control power to the auxiliary motors 125 varying an amount of energy harvested by selected ones of the auxiliary rotors 120 or driving the auxiliary rotors 120. The control unit 150 may drive the auxiliary motors 125 "forward" to generate varying amounts of auxiliary thrust, or "backward" to produce varying amounts of mixed aerodynamic forces. In addition, when the control unit 150 allows the auxiliary rotors 120 to freewheel, the auxiliary rotors 120 will not harvest any energy from the downwash of air generated by the primary rotor 110.

Energy harvested from the downwash of air may be stored in the onboard battery 170. In some embodiments, the onboard battery 170 may be sized to store enough power to provide for a safe landing for the UAV 100 in the event of an emergency, but may be smaller and lighter than would be necessary to accomplish a complete mission using just the auxiliary rotors.

When the onboard battery 170 is fully charged, extra energy may be dissipated using the dump resistor 173. A dump controller 171 may be included that regulates the amount of energy dissipated through the dump resistor 173. The UAV 100 may avoid needing the adjustable throttle 117 for the primary motor 115 by using the dump resistor 173. In this way, the UAV 100 may operate at full throttle (i.e., a fixed throttle setting) and as long as the primary motor 115 (i.e., the internal combustion engine) is designed to have slightly more thrust than is needed for flight, the extra energy may be dumped using the dump resistor 173 to control flight (e.g., maintain altitude). The adjustable throttle 117 may be desirable for more precise thrust control over the primary rotor 110. In some embodiments, if both the adjustable throttle 117 and the dump resistor 173 are included, the control unit 150 may regulate their functions as part of power management.

The control unit 150 may include (but is not limited to) a power module 151, payload-securing units 175, an input module 180, sensors 182, an output module 185, a radio module 190, or any combination thereof. The processor 160 may include or be coupled to memory 161 and a navigation unit 163. The processor 160 may be coupled to the one or more payload-securing units 175 and the sensors 182. The payload-securing units 175 may include an actuator motor that drives a gripping and release mechanism and related controls that are responsive to the control unit 150 to grip and release a payload in response to commands from the control unit 150.

The sensors 182 may be optical sensors, radio sensors, a camera, and/or other sensors. Alternatively or additionally, the sensors 182 may be contact or pressure sensors that may provide a signal that indicates when the UAV 100 has landed. The power module 151 may include one or more batteries that may provide power to various components, including the processor 160, the payload-securing units 175, the input module 180, the sensors 182, the output module 185, and the radio module 190.

The onboard battery 170 may include energy storage components, such as rechargeable batteries. The processor 160 may be configured with processor-executable instructions to control the charging of the onboard battery 170 and/or the power module 151 (i.e., the storage of energy harvested from the downwash of air from the primary rotor), such as by executing a charging control algorithm using a charge control circuit. In some embodiments, the onboard battery 170 and/or the power module 151 may be configured to manage charging. The processor 160 may be coupled to an output module 185, which may output control signals for managing the motors that drive the primary rotor 110 or the auxiliary rotors 120 and other components.

Through control of individual ones of the auxiliary motors 125 corresponding to each of the auxiliary rotors 120, the UAV 100 may be controlled in flight as the UAV 100 progresses toward a destination and/or operates in various modes (e.g., the emergency recovery mode or the braking mode). The processor 160 may receive data from the navigation unit 163 and use such data in order to determine the present position and orientation of the UAV 100, as well as the appropriate course towards the destination or landing sites. In various embodiments, the navigation unit 163 may include a global navigation satellite system (GNSS) receiver system (e.g., one or more Global Positioning System (GPS) receivers) enabling the UAV 100 to navigate using GNSS signals. Alternatively or in addition, the navigation unit 163 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 160 and/or the navigation unit 163 may be configured to communicate with a server (e.g., 1000 in FIG. 10) through a wireless connection (e.g., a cellular data network) to receive commands to control flight, receive data useful in navigation, provide real-time position altitude reports, and assess data. An avionics module 167 coupled to the processor 160 and/or the navigation unit 163 may be configured to provide flight control-related information such as altitude, attitude, airspeed, heading and similar information that the navigation unit 163 may use for navigation purposes, such as dead reckoning between GNSS position updates. The avionics module 167 may include or receive data from a gyro/accelerometer unit 165 that provides data regarding the orientation and accelerations of the UAV 100 that may be used in navigation and positioning calculations.

The radio module 190 may be configured to receive signals, such as command signals for controlling flight protocol, receive signals from aviation navigation facilities, etc., and provide such signals to the processor 160 and/or the navigation unit 163 to assist in UAV operation. In various embodiments, the navigation unit 163 may use signals received from recognizable radio-frequency (RF) emitters (e.g., AM/FM radio stations, Wi-Fi access points, and cellular network base stations) on the ground. The locations, unique identifiers, signal strengths, frequencies, and other characteristic information of such RF emitters may be stored in a database and used to determine position (e.g., via triangulation and/or trilateration) when RF signals are received by the radio module 190. Such a database of RF emitters may be stored in the memory 161 of the UAV 100, in a ground-based server in communication with the processor 160 via a wireless communication link, or in a combination of the memory 161 and a ground-based server.

Navigating using information about RF emitters may use any of a number of conventional methods. For example, upon receiving an RF signal via the radio module 190, the processor 160 may obtain the signals unique identifier (e.g., a service sector identification (SSID), a media access control (MAC) address, radio station call sign, cell ID, etc.), and use that information to obtain the ground coordinates and signal strength of the detected RF emitter from the database of RF emitter characteristics. If the database is stored in the memory 161, the processor 160 may use the emitter identifier information to perform a table look up in the database. Alternatively or in addition, the processor 160 may use the radio module 190 to transmit the detected RF emitter identifier to a Location Information Service (LIS) server, which may return a location of the RF emitter obtained an RF emitter location database. Using the RF emitters' coordinates and optionally the signal strength characteristics, the processor 160 (or the navigation unit 163) may estimate the location of the UAV 100 relative to those coordinates. Using locations of three or more RF emitters detected by the radio module 190, the processor may determine a more precise location via trilateration. Estimates of location based on received ground-based RF emitters may be combined with position information from a GNSS receiver to provide more precise and reliable location estimates than achievable with either method alone.

The processor 160 may use the radio module 190 to conduct wireless communications with a variety of wireless communication devices 900, such as a beacon, server, smartphone, tablet, or other computing device with which the UAV 100 may be in communication. A bi-directional wireless communication link 950 may be established between a transmit/receive antenna of the radio module 190 and a wireless communication device antenna 910 (i.e., a transmit/receive antenna) of the wireless communication device 900. Alternatively or additionally, the bi-directional wireless communication link 950 may communicate with a cellular network base station or cell tower. The radio module 190 may be configured to support multiple connections with different wireless communication devices 900 having different radio access technologies. In various embodiments, the wireless communication device 900 may be connected to a server through intermediate access points. In an example, the wireless communication device 900 may be a server of a UAV operator, a third party service (e.g., package delivery, billing, etc.), or a site communication access point. The UAV 100 may communicate with a server through one or more intermediate communication links, such as one or more network nodes or other communication devices.

The UAV 100 may receive signals from wireless communication devices 900 through the bi-directional wireless communication link 950 as the UAV 100 is in midflight, such as while in normal, extended flight, emergency recovery, and/or braking modes. The bi-directional wireless communication link 950 may provide information about descent profiles, emergency recovery parameters, location information, and/or landing site.

In various embodiments, the radio module 190 may be configured to switch between a cellular connection and a Wi-Fi or other form of radio connection depending on the location and altitude of the UAV 100. For example, while in flight at an altitude designated for UAV traffic, the radio module 190 may communicate with a cellular infrastructure in order to maintain communications with a server (e.g., 1000 in FIG. 10). An example of a flight altitude for the UAV 100 may be at around 400 feet or less, such as may be designated by a government authority (e.g., FAA) for UAV flight traffic. At this altitude, it may be difficult to establish communication with some of the wireless communication devices 900 using short-range radio communication links (e.g., Wi-Fi). Therefore, communications with other wireless communication devices 900 may be established using cellular telephone networks (or other suitable communication networks or protocols) while the UAV 100 is at flight altitude. Communication between the radio module 190 and the wireless communication device 900 may transition to a short-range communication link (e.g., Wi-Fi or Bluetooth) when the UAV 100 moves closer to the wireless communication device 900. Similarly, the UAV 100 may include and employ other forms of radio communication, such as mesh connections with other UAVs or connections to other information sources (e.g., balloons or other stations for collecting and/or distributing weather or other data harvesting information).

In various embodiments, the control unit 150 may be equipped with the input module 180, which may be used for a variety of applications. For example, the input module 180 may receive images or data from an onboard camera or sensor (e.g., 182), or may receive electronic signals from other components (e.g., a payload). The input module 180 may receive an activation signal for causing actuators on the UAV 100 to deploy a parachute, landing cushions, or similar components for implementing an emergency landing. In addition, the output module 185 may be used to activate components (e.g., an energy cell, an actuator, an indicator, a circuit element, a sensor, and/or an energy-harvesting element).

While the various components of the control unit 150 are illustrated or described as separate components, some or all of the components (e.g., the processor 160, the output module 185, the radio module 190, and other units) may be integrated together in a single device or module, such as a system-on-chip module.

Figure 4:
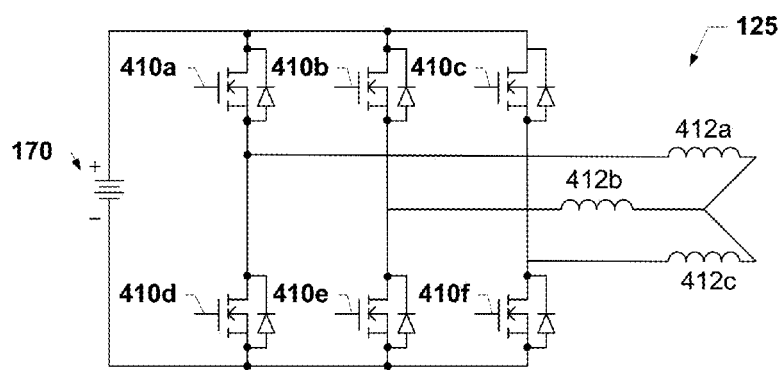
FIG. 4 is a schematic circuit diagram illustrating an electric motor of an auxiliary rotor of a UAV according to various embodiments.

FIG. 4 illustrates a schematic circuit diagram of a three-phase brushless DC motor configuration that may be used for the auxiliary motors (e.g., 125 in FIGS. 1A-4) of various embodiments. With reference to FIGS. 1A-4, in some embodiments, each of the auxiliary motors 125 may include six metal-oxide semiconductor field-effect transistor (MOSFETs) 410a, 410b, 410c, 410d, 410e, 410f coupled to the motor windings 412a, 412b, 412c. During flight, the auxiliary rotors 120 may most often operate in braking mode, which adds resistance to the rotation by the auxiliary rotors 120. Such resistance may be added by various methods. One method involves controlling a PWM circuit to bring a motor speed of individual ones of the auxiliary motors 125 below a freewheeling speed corresponding to a rotational velocity driven by the downwash of air generated by the primary rotor. When this occurs, the individual ones of the auxiliary motors 125 controlled in this way may create a resistance torque and may direct power back to the battery.

Another method involves leaving a first set of the MOSFETs (e.g., the top MOSFETs 410a, 410b, 410c) off and turning a second set of the MOSFETs (e.g., the bottom MOSFETs 410d, 410e, 410f) on and off via a PWM signal from the PWM circuit. The amount of resistance torque generated will be proportional to a duty cycle of the PWM circuit, and the power thus captured may be sent back to the onboard battery 170 via body diodes of the first set of the MOSFETs (e.g., the top MOSFETs 410a, 410a, 410c).

In thrust mode, the individual ones of the auxiliary motors 125 may be driven normally. For example, the six MOSFETs 410a, 410b, 410c, 410d, 410e, 410f corresponding to a single auxiliary motor 125 may be opened and closed in sequence causing the motor windings 412a, 412b, 412c, to generate a rotating magnetic field that may drive the single auxiliary motor 125. The speed of each of the auxiliary motors 125 may be changed by pulse-width modulating a gate drive of active ones of the six MOSFETs 410a, 410b, 410c, 410d, 410e, 410f. A 100% duty cycle may provide maximum speed; while a reduced pulse-width modulating duty cycles may reduce a speed of the respective auxiliary motor 125.

Figure 5:
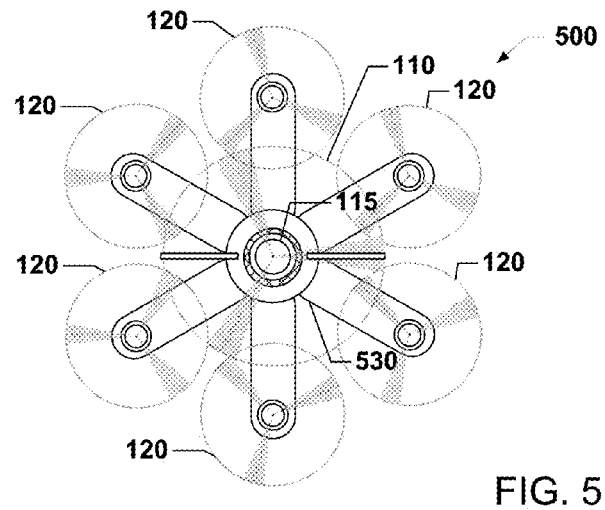
FIG. 5 is a top view of a 7-rotor UAV with a hybrid rotor drive according to various embodiments.

FIG. 5 illustrates a top plan view of a UAV 500 that may be used with various embodiments. With reference to FIGS. 1A-5, the UAV 500 (which may generally correspond to the UAV 100 in FIGS. 1A-3) may include a primary rotor 110 and six auxiliary rotors 120 supported by a frame 530. In this way, the UAV 500 is an example of a 7-rotor vehicle.

Figure 6:
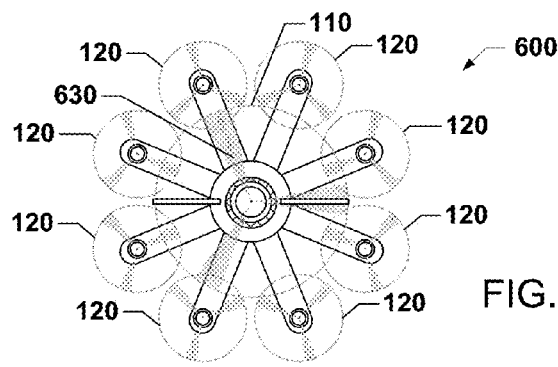
FIG. 6 is a top view of a 9-rotor UAV with a hybrid rotor drive according to various embodiments.

FIG. 6 illustrates a top plan view of a UAV 600 that may be used with various embodiments. With reference to FIGS. 1A-6, the UAV 600 (which may generally correspond to the UAV 100 in FIGS. 1A-3) may include a primary rotor 110 and eight auxiliary rotors 120 supported by a frame 630. In this way, the UAV 600 is an example of a 9-rotor vehicle.

Figure 7:
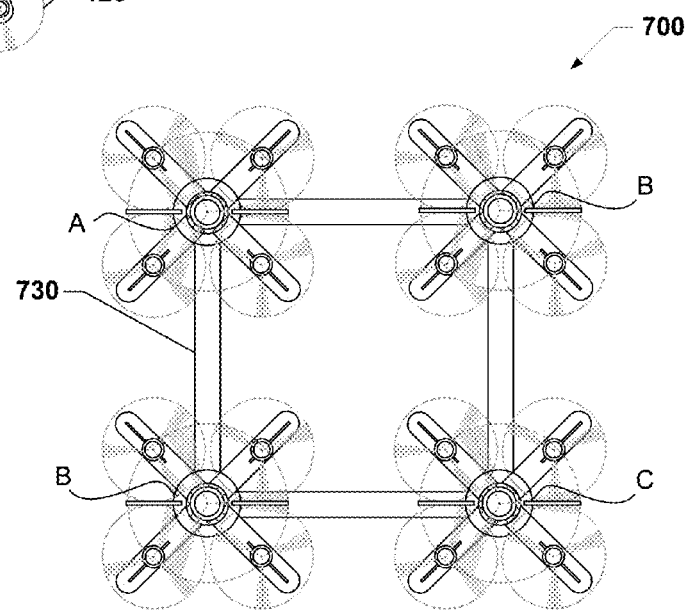
FIG. 7 is a top view of a 20-rotor UAV with four distinct hybrid rotor drives according to various embodiments.

FIG. 7 illustrates a top plan view of a UAV 700 that may be used with various embodiments. With reference to FIGS. 1A-7, the UAV 700 may include four sets of hybrid rotor drives A, B, C, D, similar to those described with regard to UAV 100. The sets of hybrid rotor drives A, B, C, D may be secured to one another through a frame 730. The UAV 700 is thus an example of a 20-rotor vehicle. Each of the hybrid rotor drives A, B, C, D of the UAV 700 may include a primary rotor (e.g., 110 in FIG. 1) and four auxiliary rotors (e.g., 120 in FIG. 1). In addition, each of the hybrid rotor drives A, B, C, D may operate similar to a conventional quad copter rotor. However in contrast to a conventional quad copter rotor, the hybrid rotor drives A, B, C, D may vary their individual output by adjusting the differential mixed aerodynamic forces produced by respective sets of the auxiliary rotors and may keep each primary rotor operating at a set throttle.

Figure 8:
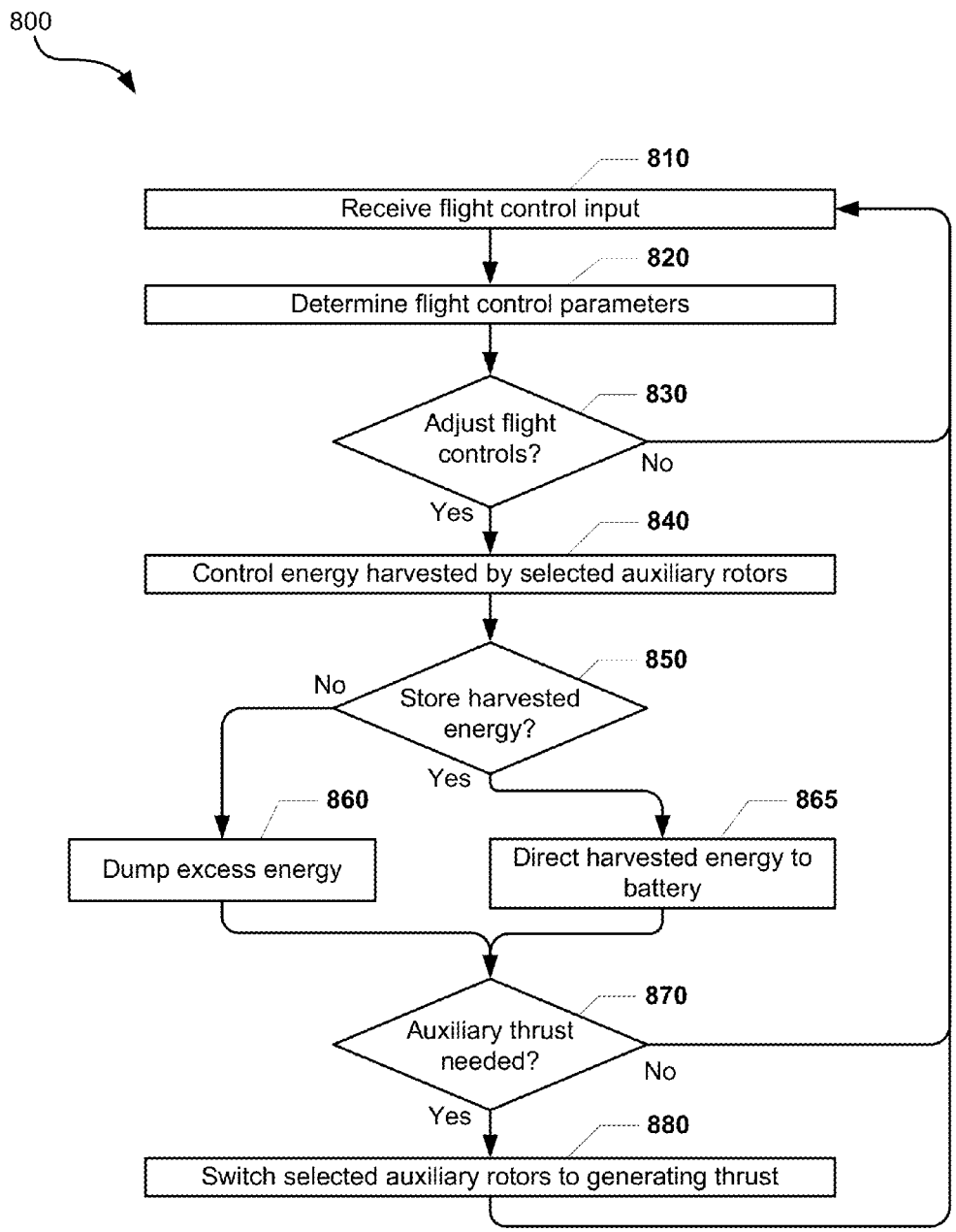
FIG. 8 is a process flow diagram illustrating a method of operating a UAV according to various embodiments.

FIG. 8 illustrates a method 800 of operating a UAV with a hybrid rotor drive that includes an air link between a primary rotor and at least four auxiliary rotors, according to various embodiments. With reference to FIGS. 1A-8, operations of the method 800 may be performed by a UAV control unit (e.g., 150) or other computing device (e.g., wireless communication devices 900 or server 1000) associated with the UAV 100.

In block 810, the processor of the UAV (e.g., the processor 160 in the control unit 150 or processor in a remote device, such as the wireless communication device 900 or server 1000) may receive one or more flight control inputs. The flight control input may be received, for example, from the input module (e.g., 180), sensors (e.g., 182), and/or the radio module (e.g., 190). The processor may access the flight control input in response to changes to the UAV, the payload, mission requirements, or environmental elements that may require the processor to review and reassess flight controls. The flight control input may be received before the UAV takes flight, during a flight from one location to another, after landing but before a subsequent flight, or other suitable time.

In block 820, the processor of the UAV may determine flight control parameters based on the received flight control input. Flight control parameters may include settings for the auxiliary rotors (e.g., 120) to provide stabilized flight control. Such settings may include the different levels of mixed aerodynamic forces each auxiliary rotor should produce (i.e., differential mixed aerodynamic forces). Such settings may indicate how much energy should be harvested from the downwash of air and either stored in the battery (e.g., 170) of the UAV or otherwise dissipated (e.g., via the dump resistor 173). Alternatively, such settings may include an amount of auxiliary thrust needed by one or more of the auxiliary rotors for providing appropriate flight control of the UAV. Further, such settings may even indicate that a radial position of the auxiliary rotors should be changed in order to increase or decrease how much of each auxiliary rotor is disposed in the downwash of air generated by the primary rotor.

In determination block 830, the processor may determine whether flight controls of the UAV need to be adjusted. Thus, the processor may compare previously set flight control parameters to updated/current ones determined in block 820. In response to determining that no change is needed to the flight controls of the UAV (i.e., determination block 830="No"), the processor may wait to receive new flight control input in block 810. In response to determining that the flight controls of the UAV need to be adjusted (i.e., determination block 830="Yes"), the processor may control an amount of energy harvested by selected ones of the plurality of auxiliary rotors as part of implementing flight control parameters that provide the flight control for the UAV in block 840.

In block 840, controlling the amount of energy harvested by selected ones of the plurality of auxiliary rotors may include harvesting different amounts of energy from some or all of the plurality of auxiliary rotors. The control of the amount of energy harvested may be implemented using a plurality of auxiliary motors each coupled to a respective auxiliary rotor of the plurality of auxiliary rotors. Each of the plurality of auxiliary motors may include a pulse-width modulation (PWM) circuit configured to selectively couple windings of a respective auxiliary motor of the plurality of auxiliary motors to the battery. Selectively adjusting the timing and manner in which auxiliary motor windings are connected to the battery adjusts the amount of energy harvested by the respective auxiliary rotor and stored in a battery or dissipated in a dump resistor (e.g., when the battery is fully charged).

Optionally, as part of adjusting the energy harvested by the auxiliary rotors in block 840, the processor may activate an actuator for moving a position of the auxiliary rotors. For example, the auxiliary rotors may be made to move along tracks radially extending from a central portion of a frame of the UAV. Movement of the auxiliary rotors closer to the primary rotor will dispose more of the auxiliary rotors in the downwash of air generated by the primary rotor. The auxiliary rotors will have a greater ability to generate mixed aerodynamic forces when operating almost entirely within the downwash of the primary rotor. In contrast, movement of the auxiliary rotors further from the primary rotor will dispose less of the auxiliary rotors in a downwash of air generated by the primary rotor. The auxiliary rotors will tend to lose the ability to generate mixed aerodynamic forces when operating almost entirely outside the downwash of the primary rotor.

In determination block 850, the processor may determine whether to store energy harvested by the auxiliary rotors. If the onboard battery is full or the processor otherwise determines that no more energy needs to be stored (i.e., determination block 850="No"), the energy harvested by the auxiliary rotors is dissipated (dumped) or otherwise not stored. For instance, by using a switch, the processor may direct energy harvested by the auxiliary rotors to a dump resistor (e.g., 173 in FIG. 3) in block 860. If processor determines that the harvested energy should be stored (i.e., determination block 850="Yes"), the processor may direct harvested energy to the onboard battery in block 865.

In determination block 870, the processor may determine whether the auxiliary rotors need to be switched over to a thrust generating mode. For example if the amount of differential mixed aerodynamic forces produced from selectively harvesting energy by selected ones of the plurality of auxiliary rotors does not achieve stable flight, one or more of the auxiliary rotors may be controlled (by being selectively connected to the battery) to generate auxiliary thrust.

If auxiliary thrust from one or more of the auxiliary rotors is not needed to maintain stable flight (i.e., determination block 870="No"), the processor may continue to receive flight control input in block 810.

If auxiliary thrust from one or more of the auxiliary rotors is needed (i.e., determination block 870="Yes"), the processor may switch selected auxiliary rotors to generate thrust in block 880, by connecting the battery to selected ones of the plurality of auxiliary rotors. Auxiliary thrust generated by the auxiliary rotors may provide at least part of the flight control for the UAV. In various embodiments, the auxiliary thrust generated by the auxiliary rotors may generate sufficient auxiliary thrust to land the UAV without propulsion from the primary rotor or even generate sufficient auxiliary thrust to enable take off without propulsion from the primary rotor. Optionally, the processor may use a combination of energy harvesting and generating auxiliary thrust for propulsion by using different auxiliary rotors implementing different portions of flight control parameters. With one or more of the auxiliary rotors generating auxiliary thrust, the processor may continue to monitor for further flight control input in block 810.

Figure 9:
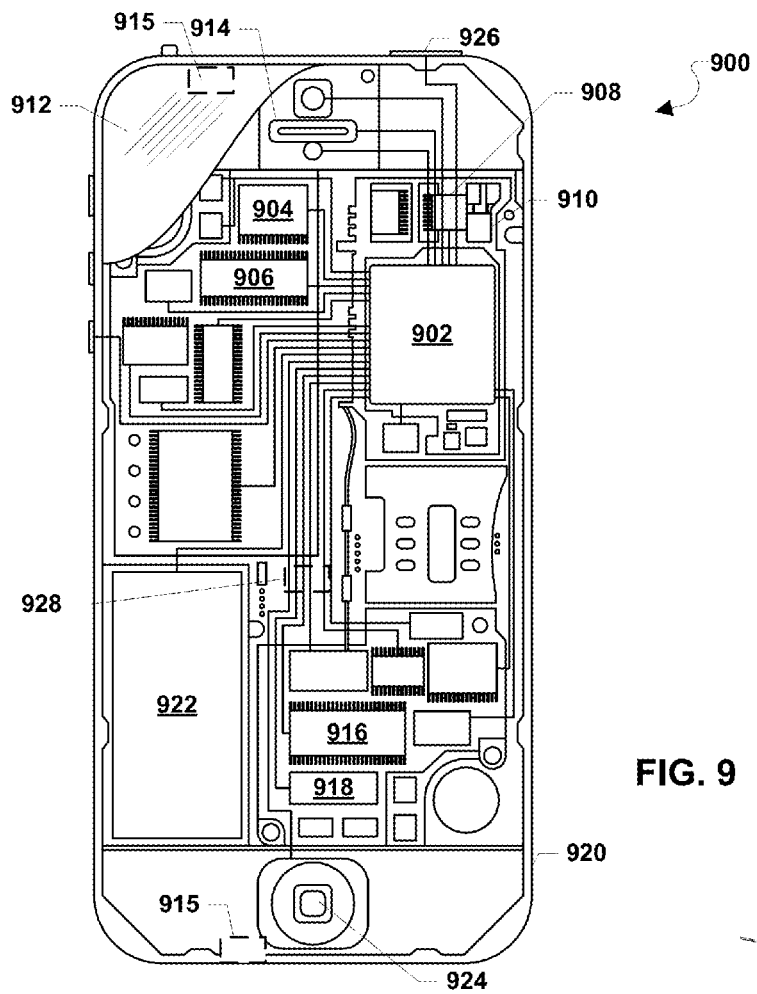
FIG. 9 is a component diagram of a wireless communication device suitable for use with various embodiments.

In various embodiments, communication with the UAV 100 may be implemented using any of a variety of wireless communication devices (e.g., smartphones, tablets, smartwatches, etc.) an example of which, wireless communication device 900, is illustrated in FIG. 9. With reference to FIGS. 1A-9, the wireless communication device 900 may include a processor 902 coupled with the various systems of the wireless communication device 900 for communication with and control thereof. For example, the processor 902 may be coupled to a touch screen controller 904, radio communication elements, speakers and microphones, and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. In some embodiments (not shown), the wireless communication device 900 may also be coupled to an external memory, such as an external hard drive.

The touch screen controller 904 and the processor 902 may also be coupled to a touch screen panel 912, such as a resistive-sensing touch screen, capacitive-sensing touch screen, infrared sensing touch screen, etc. Additionally, the display of the wireless communication device 900 need not have touch screen capability. The wireless communication device 900 may have one or more radio signal transceivers 908 (e.g., Peanut, Bluetooth, Bluetooth LE, ZigBee, Wi-Fi®, radio frequency (RF) radio, etc.) and antennae, the wireless communication device antenna 910, for sending and receiving communications, coupled to each other and/or to the processor 902. The radio signal transceivers 908 and the wireless communication device antenna 910 may be used with the above-mentioned circuitry to implement the various wireless transmission protocol stacks and interfaces. The wireless communication device 900 may include a cellular network wireless modem chip 916 coupled to the processor that enables communication via a cellular network.

The wireless communication device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

In various embodiments, the wireless communication device 900 may include one or more microphones 915. For example, the wireless communication device may have microphones 915 that are conventional for receiving voice or other audio frequency energy from a user during a call.

The wireless communication device 900 may also include speakers 914 for providing audio outputs. The wireless communication device 900 may also include a housing 920, constructed of a plastic, metal, or a combination of materials, for containing all or some of the components discussed herein. The wireless communication device 900 may include a power source 922 coupled to the processor 902, such as a disposable or rechargeable battery. The rechargeable battery may also be coupled to the peripheral device connection port to receive a charging current from a source external to the wireless communication device 900. The wireless communication device 900 may also include a physical button 924 for receiving user inputs. The wireless communication device 900 may also include a power button 926 for turning the wireless communication device 900 on and off.

In various embodiments, the wireless communication device 900 may further include an accelerometer 928, which senses movement, vibration, and other aspects of the device through the ability to detect multi-directional values of and changes in acceleration. In the various embodiments, the accelerometer 928 may be used to determine the x, y, and z positions of the wireless communication device 900. Using the information from the accelerometer, a pointing direction of the wireless communication device 900 may be detected.

Various forms of computing devices may be used to communicate with a processor of a UAV, including personal computers, wireless communication devices (e.g., smartphones, etc.), servers, laptop computers, etc., to implement the various embodiments including the embodiments described with reference to FIGS. 1A-10. Such computing devices may typically include, at least, the components illustrated in FIG. 10, which illustrates an example server computing device (server 1000). With reference to FIGS. 1A-10, the server 1000 may typically include a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 (or interfaces) coupled to the processor 1001 for establishing data connections 1005 with a network, such as the Internet and/or a local area network coupled to other system computers and servers. Similarly, the server 1000 may include additional access ports, such as USB, Firewire, Thunderbolt, and the like for coupling to peripherals, external memory, or other devices.

In various embodiments, the UAV (e.g., 100) may be configured to periodically check the functioning of the navigation unit (e.g., 163) and/or communication links with the server 1000. Such functionality may be checked through a periodic heart beat check. For example, the UAV may receive periodic communications from the server 1000 indicating that a wireless connection is still maintained and viable. Alternatively or in addition, the UAV may send periodic communications to the server 1000 providing current location coordinates of the UAV and/or indicating that the navigation unit and other UAV systems are still functioning. If the processor (e.g., 160) of the UAV determines that the navigation unit and other UAV systems are not functioning, corrective action may be taken. For example, in the event the UAV loses contact with an information source or other communication link, such as due to jamming, pirate signals, masking by buildings, or tampering of the UAV, and the UAV has no other way to determine location, the UAV may issue an alert to the server 1000 and land. During such a landing, the UAV may exploit the emergency recovery mode harvesting, if conditions warrant. In this way, the UAV may autonomously determine a descent profile, including identification of impromptu potential landing sites, or use information it already has to locate designated landing site.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. An unmanned aerial vehicle (UAV), comprising:
a frame;
a primary rotor supported by the frame and configured to generate thrust with a downwash of air;
a plurality of auxiliary rotors supported by the frame to each at least partially be disposed in the downwash of air generated by the primary rotor, wherein the plurality of auxiliary rotors are configured to harvest energy from the downwash of air;
a battery configured to store at least some of the energy harvested from the downwash of air by the plurality of auxiliary rotors; and
a processor coupled to the plurality of auxiliary rotors and the battery, wherein the processor is configured with processor-executable instructions to utilize the plurality of auxiliary rotors to provide flight control for the UAV.

2. The UAV of claim 1, wherein the processor is further configured with the processor-executable instructions to:
control an amount of energy harvested by selected ones of the plurality of auxiliary rotors as part of implementing flight control parameters that provide the flight control for the UAV.

3. The UAV of claim 2, wherein the processor is further configured with the processor-executable instructions to:
receive a flight control input;
determine the flight control parameters for the UAV based on the flight control input.

4. The UAV of claim 2, wherein the processor is further configured with the processor-executable instructions such that the control of the amount of energy harvested by the selected ones of the plurality of auxiliary rotors includes harvesting different amounts of energy from at least two of the plurality of auxiliary rotors.

5. The UAV of claim 1, further comprising:
a plurality of auxiliary motors each coupled to a respective auxiliary rotor of the plurality of auxiliary rotors, wherein each of the plurality of auxiliary motors includes a pulse width modulation circuit configured to selectively couple windings of a respective auxiliary motor of the plurality of auxiliary motors to the battery in order to adjust an amount of energy harvested by the respective auxiliary rotor or an amount of power drawn from the battery to generate auxiliary thrust by the respective auxiliary rotor.

6. The UAV of claim 1 further comprising:
a plurality of auxiliary motors each coupled to a respective auxiliary rotor of the plurality of auxiliary rotors, wherein each of the plurality of auxiliary motors includes a first set of metal-oxide semiconductor field-effect transistors (MOSFETs) and a second set of MOSFETs,
wherein the processor is further configured with the processor-executable instructions to:
control the first and second sets of MOSFETS differently in order to adjust an amount of energy harvested by the respective auxiliary rotor or an amount of power drawn from the battery to generate auxiliary thrust by the respective auxiliary rotor.

7. The UAV of claim 1, wherein the processor is further configured with the processor-executable instructions to:
connect the battery to selected ones of the plurality of auxiliary rotors in order to generate auxiliary thrust to provide at least part of the flight control for the UAV.

8. The UAV of claim 1, wherein the processor is further configured with the processor-executable instructions to:
connect the battery selectively to each of the plurality of auxiliary rotors to generate sufficient auxiliary thrust to land the UAV without propulsion from the primary rotor.

9. The UAV of claim 1, wherein the processor is further configured with the processor-executable instructions to:
connect the battery selectively to each of the plurality of auxiliary rotors to generate sufficient auxiliary thrust to enable take off without propulsion from the primary rotor.

10. The UAV of claim 1, wherein the processor is further configured with the processor-executable instructions to:
implement flight control parameters that provide the flight control by:
controlling an amount of energy harvested by a first one of the plurality of auxiliary rotors; and
connecting the battery to a second one of the plurality of auxiliary rotors to generate auxiliary thrust for propulsion of the UAV.

11. The UAV of claim 1, further comprising:
a dump resistor electrically coupled to the plurality of auxiliary rotors via a switch coupled to the processor and configured to dissipate energy harvested by one or more auxiliary rotors in response to a signal received from the processor.

12. The UAV of claim 1, wherein each of the plurality of auxiliary rotors are movable along a separate radially extending track secured to the frame, wherein movement of each of the plurality of auxiliary rotors along the separate radially extending track varies how much of each of the plurality of auxiliary rotors is disposed in the downwash of air.

13. The UAV of claim 1, wherein the processor is further configured with the processor-executable instructions to:
adjust an adjustable throttle setting that controls the primary rotor.

14. The UAV of claim 1, wherein the primary rotor is powered by an internal combustion engine.

15. The UAV of claim 1, wherein the plurality of auxiliary rotors are equally spaced away from a rotational axis of the primary rotor.

16. The UAV of claim 1, wherein the plurality of auxiliary rotors includes at least four auxiliary rotors.

17. A method of operating an unmanned aerial vehicle (UAV) comprising a primary rotor, a plurality of auxiliary rotors configured to be able to harvest energy from a downwash of air generated by the primary rotor, and a battery configured to store at least some of the energy harvested by the plurality of auxiliary rotors, the method comprising:
receiving a flight control input;
determining flight control parameters that provide flight control for the UAV based on the flight control input; and
controlling an amount of energy harvested by selected ones of the plurality of auxiliary rotors as part of implementing the determined flight control parameters.

18. The method of claim 17, wherein controlling the amount of energy harvested by selected ones of the plurality of auxiliary rotors includes harvesting different amounts of energy from at least two of the plurality of auxiliary rotors.

19. The method of claim 17, wherein each of the plurality of auxiliary rotors is coupled to a respective auxiliary motor of a plurality of auxiliary motors, wherein controlling the amount of energy harvested by selected ones of the plurality of auxiliary rotors comprises:
selectively coupling windings of the respective auxiliary motor to the battery in order to adjust the amount of energy harvested by selected ones of the plurality of auxiliary rotors or an amount of power drawn from the battery to generate auxiliary thrust by a select one of the plurality of auxiliary rotors.

20. The method of claim 17, wherein controlling the amount of energy harvested by selected ones of the plurality of auxiliary rotors comprises:
controlling first and second sets of metal-oxide semiconductor field-effect transistors (MOSFETs) differently in order to adjust the amount of energy harvested by an individual one of the plurality of auxiliary rotors or an amount of power drawn from the battery to generate auxiliary thrust by the individual one of the plurality of auxiliary rotors.

21. The method of claim 17, further comprising:
connecting the battery to selected ones of the plurality of auxiliary rotors in order to generate auxiliary thrust to provide at least part of the flight control for the UAV.

22. The method of claim 17, further comprising:
connecting the battery selectively to each of the plurality of auxiliary rotors to generate sufficient auxiliary thrust to land the UAV without propulsion from the primary rotor.

23. The method of claim 17, further comprising:
connecting the battery selectively to each of the plurality of auxiliary rotors to generate sufficient auxiliary thrust to enable take off without propulsion from the primary rotor.

24. The method of claim 17, wherein controlling the amount of energy harvested by selected ones of the plurality of auxiliary rotors further comprises:
controlling the amount of energy harvested by a first one of the plurality of auxiliary rotors; and
connecting the battery to a second one of the plurality of auxiliary rotors to generate auxiliary thrust for propulsion of the UAV.

25. The method of claim 17, further comprising:
dissipating energy harvested from the downwash of air by electrically coupling a dump resistor to select ones of the plurality of auxiliary rotors.

26. The method of claim 17, wherein controlling the amount of energy harvested by the plurality of auxiliary rotors includes activating an actuator that moves at least one of the plurality of auxiliary rotors along a track radially extending from a central portion of a frame of the UAV, wherein movement of the at least one of the plurality of auxiliary rotors along the track varies how much of each of the plurality of auxiliary rotors is disposed in the downwash of air generated by the primary rotor.

27. The method of claim 17, further comprising:
adjusting an adjustable throttle setting controlling the primary rotor.

28. An unmanned aerial vehicle (UAV), comprising:
a primary rotor configured to generate thrust with a downwash of air;
a plurality of auxiliary rotors each at least partially disposed in the downwash of air generated by the primary rotor, wherein the plurality of auxiliary rotors are configured to be able to harvest energy from the downwash of air;
means for receiving a flight control input;
means for determining flight control parameters that provide flight control for the UAV based on the flight control input; and
means for controlling an amount of energy harvested by selected ones of the plurality of auxiliary rotors as part of implementing the determined flight control parameters.

29. A non-transitory processor-readable storage medium having stored thereon processor-executable instructions configured to cause a processor of an unmanned aerial vehicle (UAV) having a primary rotor and a plurality of auxiliary rotors configured to be able to harvest energy from a downwash of air generated by the primary rotor to perform operations comprising:
receiving a flight control input;
determining flight control parameters that provide flight control for the UAV based on the flight control input; and
controlling an amount of energy harvested by selected ones of the plurality of auxiliary rotors as part of implementing the determined flight control parameters.

* * * * *